March 28, 1939. S. Y. WHITE 2,152,448
ELECTRICAL SYSTEM
Filed Aug. 8, 1925
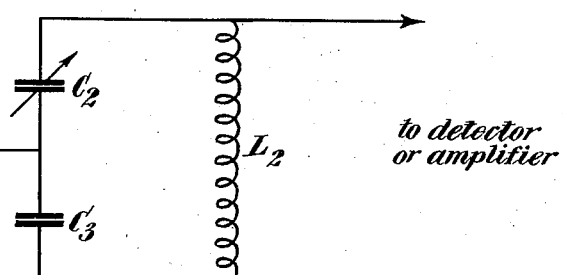
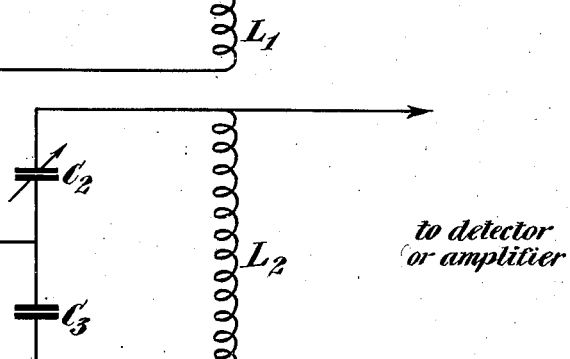
Inventor
Sidney Y. White
By his Attorney Patented Mar. 28, 1939

2,152,448

UNITED STATES PATENT OFFICE 2,152,448

ELECTRICAL SYSTEM

Sidney Y. White, New York, N. Y., assignor to Edward H. Loftin, as trustee

Application August 8, 1925, Serial No. 48,936

8 Claims. (Cl. 178—44)

While my invention relates generally to transferring electrical energy from one circuit to another, it has for a particular object transferring such energy at a predetermined rate irrespective of the frequency of the electrical currents representing the energy in an exciting circuit with which an absorbing or receiving circuit is associated.

A further particular object of my invention is to make the rate of energy transfer from the exciting circuit to the absorbing circuit constant irrespective of the frequency of the currents whose energy is being transferred.

Another object of my invention is to accomplish the aforesaid objects with means whose operations are electrical instead of mechanical, and which means are simple, inexpensive and easy to adjust for the desired results in ordinary electrical systems.

My invention offers many advantages in the reception of high frequency electrical signals, particularly in radio systems.

The general and most used form of coupling in electrical practice by which energy is transferred from one circuit to another is the inductive type, usually non-conductive, or indirect, comprising two associated coils or windings. In such a form of coupling the rate of energy transfer between the two circuits decreases as the frequency of the currents representing the energy decreases, resulting in such systems being efficient in operation at only one point in the band of frequencies which the system is intended to include. This effect is particularly noticeable in ordinary radio receiving sets which comprise a number of circuits in tandem, which circuits are tunable through a given range of frequencies and inductively coupled one to the other. Efficient operation is obtained usually at the higher frequencies and falls off materially at the lower frequencies.

My invention will be best understood by reference to the figures in the accompanying drawing in which like reference characters represent like elements in the two figures.

Figure 1 is a diagrammatic illustration of my invention in its simplest form. Figure 2 is a digrammatic representation of my invention in a more extended form for specific results.

In Fig. 1 A is an antenna connected to earth at G through a condenser C3, and may or may not include a condenser C1, as shown. The circuit that is traced may be termed an exciting circuit in that it may collect energy of any desired frequency and make it available for transfer to another or absorbing circuit. A second or absorbing circuit is shown to include an inductance L2, a condenser C3, and a variable condenser C2. By varying the capacity of the condenser C2, the absorbing circuit can be made approximately resonant to any one of a large number of current frequencies that might exist in the exciting or antenna circuit, and with such adjustment energy of the desired frequency is transferred from the exciting circuit into the absorbing circuit across the reactance of condenser C3. It is obvious that with the capacity of the condenser C3 fixed its reactance will increase with decrease of current frequency, which fact gives a current or energy transfer characteristic the reverse of that inherent in the ordinary inductive type of coupling. It is further obvious, however, that the reactance of the condenser C3 represents only a portion of the capacity reactance of the absorbing circuit, and that the coupling reactance between the two circuits will depend upon the relative values of the capacities of condensers C3 and C2. Thus by adjusting the values of the two condensers the coupling between the two circuits can be made to increase in a predetermined way with decrease of frequency, which is reverse to the characteristic of inductive coupling. This reverse characteristic may be desirable in some forms of electrical systems.

A coupling having a substantially constant characteristic or constant rate of energy transfer, irrespective of frequency, is particularly desirable in many forms of electrical systems.

I show an arrangement for obtaining such a characteristic in Fig. 2, which differs from Fig. 1 only by including in the antenna or exciting circuit an inductance coil L1 which is coupled or electrically associated with coil L2 in the absorbing circuit. This arrangement thus provides a capacity coupling between the two circuits across which the energy transfer increases with decrease of frequency and an inductive coupling between the two circuits across which the energy transfer decreases with decrease of frequency. It is therefore obvious that by arranging the capacity coupling so that energy transfer will vary in a predetermined way, and making this predetermined way the opposite of the energy transfer variation in coupling due to inductance, a combination is possible in which the combined or resultant coupling effect remains constant throughout a desired range of frequencies, or the coupling effect may be made to decrease or increase with frequency in any predetermined and desired way. This, of course, requires that the polarity of the inductive coupling be chosen such that the two currents of the transferred energy are in phase or aiding, for with an opposing polarity the combined transfer will be maximum at the ends of the bands of frequencies, and rapidly reduce to no transfer near the middle of the band where the two transfers would equal and oppose; that is, constant or uniformly varying transfer with frequency variation can only be obtained with assisting capacitive and inductive couplings.

While I have explained my invention in connection with an antenna and absorbing circuit common to radio practice, yet 't will be readily apparent to those skilled in the art that the principles and means are readily applicable to other forms of circuits. I do not intend, in so illustrating my invention, that its scope be limited thereby.

Having fully described my invention. I claim:

1. In an electrical energy transfer coupling system required to function comprehensively with respect to electrical alternating currents differing in frequency over a substantial range, the combination of a source of electrical alternating currents of diversified frequencies throughout a needed working range and two recipient output terminals, a circuit interposed therebetween including the secondary winding of a two-winding transformer connected in series with a condenser of variable electrical capacity values and a condenser of fixed electrical capacity value, across which latter condenser said source is connected by way of the primary winding of said transformer, said circuit elements being so chosen in relative electrical values that, by varying the electrical capacity of said variable capacity condenser, said circuit is caused to resonate with selected ones of said electrical alternating currents, and said primary winding being so poled that the resulting electromagnetic component of energy transfer aids the energy transferred electrostatically by way of said condensers, the electrical values of said condensers being so relatively proportioned that the obtained efficiency of said electrostatic energy transfer varies substantially the reverse of the inherent gradual variation of said electromagnetic component of energy transfer with variations of frequency, whereby the total efficiency of energy transfer tends towards constancy with variation of frequency, and means for non-reactively conducting energy absorbed within said circuit solely to said recipient output terminals.

2. The system combination of claim 1 in which one extremity of the secondary winding of the transformer is grounded by a substantially impedance free connection.

3. The system combination of claim 1 in which the source extremity of said primary winding of said transformer is connected to said source by way of a non-reactive connection.

4. In an electrical energy transfer coupling system required to function comprehensively with respect to electrical alternating currents differing in frequency over a substantial range, the combination of a source of electrical alternating currents of diversified frequencies throughout a needed working range and two recipient output terminals, a circuit interposed therebetween including the secondary winding of a two-winding transformer having one extremity connected to ground by a substantially impedance free connection and connected in series with a condenser of variable electrical capacity values and a condenser of fixed electrical capacity value, across which latter condenser said source is connected by way of the primary winding of said transformer by substantially impedance free connections to the extremities of said primary winding, said circuit elements being so chosen in relative electrical values that, by varying the electrical capacity of said variable capacity condenser, said circuit is caused to resonate with selected ones of said electrical alternating currents, and said primary winding being so poled that the resulting electromagnetic component of energy transfer aids the energy transferred electrostatically by way of said condensers, the values of the electrical capacities of said condensers being so relatively proportioned that the obtained efficiency of said electrostatic energy transfer varies substantially the reverse of the inherent gradual variation of said electromagnetic component of energy transfer with variations of frequency, whereby the total efficiency of energy transfer tends towards constancy with variation of frequency, and means for non-reactively conducting energy absorbed within said circuit solely to said recipient output terminals.

5. In an electrical energy transfer coupling system required to function comprehensively with respect to electrical alternating currents differing in frequency over a substantial range, the combination of a source of electrical alternating currents of diversified frequencies throughout a needed working range and two recipient output terminals, a circuit interposed therebetween including the secondary winding of a two-winding transformer connected in series with a condenser of variable electrical capacity values and a condenser of fixed electrical capacity value, across which latter condenser said source is connected by way of the primary winding of said transformer, said circuit elements being so chosen in relative electrical values that, by varying the electrical capacity of said variable capacity condenser, said circuit is caused to resonate with selected ones of said electrical alternating currents, and said primary winding being so poled that the resulting electromagnetic component of energy transfer aids the energy transferred electrostatically by way of said condensers, the values of the capacities of said condensers being so relatively proportioned that the obtained efficiency of said electrostatic energy transfer gradually varies the reverse of, but not the same as, the inherent gradual variation of the electromagnetic component of energy transfer as said interposed circuit is caused to resonate with selected ones of the electrical alternating currents, whereby a predetermined different from constant over-all energy transfer is obtained with change of frequency, and means for non-reactively conducting energy absorbed within said circuit solely to said recipient output terminals.

6. The system combination of claim 5 in which one extremity of the secondary winding of the transformer is grounded by a substantially impedance free connection.

7. The system combination of claim 5 in which the source extremity of said primary winding of the transformer is connected to said source by way of a non-reactive connection.

8. In an electrical energy transfer coupling system required to function comprehensively with respect to electrical alternating currents differing in frequency over a substantial range, the combination of a source of electrical alternating currents of diversified frequencies throughout a needed working range and two recipient output terminals, a circuit interposed therebetween including the secondary winding of a two-winding transformer having one extremity connected to ground by a substantially impedance free connection and connected in series with a condenser of variable electrical capacity values and a condenser of fixed electrical value, across which latter condenser said source is connected by way of the primary winding of said transformer by substantially impedance free connections to the extremities of said primary winding, said circuit elements being so chosen in relative electrical values that, by varying the electrical capacity of said variable capacity condenser, said circuit is caused to resonate with selected ones of said electrical alternating currents, and said primary winding being so poled that the resulting electromagnetic component of energy transfer aids the energy transferred electrostatically by way of said condensers, the electrical values of the capacities of said condensers being so relatively proportioned that the obtained efficiency of said electrostatic energy transfer gradually varies the reverse of, but not the same as, the inherent gradual variation of the electromagnetic component of energy transfer as said interposed circuit is caused to resonate with selected ones of the electrical alternating currents, whereby a predetermined different from constant over-all energy transfer is obtained with change of frequency, and means for non-reactively conducting energy absorbed within said circuit solely to said recipient output terminals.

SIDNEY Y. WHITE.